United States Patent
Wang et al.

(10) Patent No.: US 11,945,437 B2
(45) Date of Patent: Apr. 2, 2024

(54) SMART CRUISE CONTROL DISENGAGEMENT SYSTEM FOR VEHICLE DRIVING ASSISTANCE

(71) Applicant: TOYOTA MOTOR ENGINEERING & MANUFACTURING NORTH AMERICA, INC., Plano, TX (US)

(72) Inventors: Timothy Wang, Ann Arbor, MI (US); Roger Akira Kyle, Frisco, TX (US); Bryan Else Yamasaki, Ypsilanti, MI (US); Justin K. Shen, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 232 days.

(21) Appl. No.: 17/402,332

(22) Filed: Aug. 13, 2021

(65) Prior Publication Data
US 2023/0050705 A1 Feb. 16, 2023

(51) Int. Cl.
*B60W 30/14* (2006.01)
*B60W 30/095* (2012.01)
(Continued)

(52) U.S. Cl.
CPC ...... *B60W 30/146* (2013.01); *B60W 30/0953* (2013.01); *B60W 40/04* (2013.01); *B60W 40/076* (2013.01); *B60W 40/105* (2013.01); *B60W 40/13* (2013.01); *B60W 2530/16* (2013.01); *B60W 2540/10* (2013.01);
(Continued)

(58) Field of Classification Search
CPC ........... B60W 30/146; B60W 30/0953; B60W 40/04; B60W 40/076; B60W 40/105; B60W 40/13; B60W 2554/804; B60W 2552/15; B60W 2554/802; B60W 2530/16; B60W 2540/10
See application file for complete search history.

(56) References Cited

U.S. PATENT DOCUMENTS

| 6,253,144 B1 * | 6/2001 | Yamamura ......... B60K 31/0008 303/193 |
| 8,078,382 B2 | 12/2011 | Sugano et al. |

(Continued)

FOREIGN PATENT DOCUMENTS

JP 2018086939 A * 6/2018

OTHER PUBLICATIONS

Machine translation of JP-2018086939-A (Year: 2018).*

*Primary Examiner* — Jeff A Burke
*Assistant Examiner* — Mohamad O El Sayah
(74) *Attorney, Agent, or Firm* — HAYNES AND BOONE, LLP

(57) ABSTRACT

A vehicle is provided that includes a cruise control deactivation system. The system includes a cruise control system, and a user control that, when activated, commands deactivation of the cruise control system. The system also includes a processor configured to permit or override the commanded deactivation of the cruise control system while the vehicle is moving, based on at least one criterion. Criteria may include whether or not a first sensor detects a foot of a driver of the vehicle on an accelerator pedal of the vehicle, and whether or not a first computation indicates that the deactivation of the cruise control system will cause a collision with a second vehicle located behind the vehicle.

17 Claims, 6 Drawing Sheets

(51) Int. Cl.
*B60W 40/04* (2006.01)
*B60W 40/076* (2012.01)
*B60W 40/105* (2012.01)
*B60W 40/13* (2012.01)

(52) U.S. Cl.
CPC ... *B60W 2552/15* (2020.02); *B60W 2554/802* (2020.02); *B60W 2554/804* (2020.02)

(56) References Cited

U.S. PATENT DOCUMENTS

| | | |
|---|---|---|
| 10,747,220 B2 | 8/2020 | Uchida et al. |
| 10,766,489 B2 | 9/2020 | Tuncali et al. |
| 10,926,765 B2 | 2/2021 | Lotz et al. |
| 2016/0009282 A1* | 1/2016 | Tokimasa ............. G01S 13/931 701/96 |
| 2017/0355369 A1* | 12/2017 | La ................... B60W 30/18072 |

* cited by examiner

SMART CRUISE CONTROL DISENGAGEMENT SYSTEM FOR VEHICLE DRIVING ASSISTANCE

TECHNICAL FIELD

The subject matter described herein relates to devices and methods for determining whether to disengage a cruise control function of a vehicle when requested by the driver. This technology has particular but not exclusive utility for cars and trucks.

BACKGROUND

Modern motor vehicles often include Advanced Driver Assist (ADAS) features or systems that help the vehicle driver, or briefly take over for the driver, while the vehicle is being parked or driven. One such feature with a long history is cruise control, which can be activated by the vehicle driver and which adjusts the vehicle throttle to maintain a constant speed in the face of changing road conditions such as road slope. Adaptive cruise control functions may also reduce the vehicle throttle in order to, for example, maintain safe following distance behind a vehicle located in front of the ego vehicle. However, currently available cruise control functions, whether adaptive or non-adaptive, can be manually disengaged by the driver of the ego vehicle, whether or not such disengagement is intentional or safe. A need therefore exists for improved cruise control functions that address this and other problems.

The information included in this Background section of the specification, including any references cited herein and any description or discussion thereof, is included for technical reference purposes only and is not to be regarded as limiting.

SUMMARY

In accordance with at least one embodiment of the present disclosure, a smart cruise control disengagement system is provided that determines in real time whether disengagement of a cruise control function is safe. The smart cruise control disengagement system may include predicting the motion of the ego vehicle, tracking and predicting the motion of a second vehicle approaching the ego vehicle from behind, and comparing to see whether the two vehicles are expected to collide. If a collision is predicted, the system prevents the cruise control function from being disengaged. The smart cruise control disengagement system may take into account such factors as road slope or grade.

The smart cruise control disengagement system disclosed herein has particular, but not exclusive, utility for cars and trucks. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle having a cruise control deactivation system that includes a cruise control system and a user control that, when activated, commands deactivation of the cruise control system. The vehicle also includes a processor configured to permit or override the commanded deactivation of the cruise control system while the vehicle is moving, based on at least one criterion. Other embodiments of this aspect include corresponding computer systems, apparatus, and computer programs recorded on one or more computer storage devices, each configured to perform the actions of the methods.

Implementations may include one or more of the following features. In some embodiments, the at least one criterion includes whether or not a first sensor detects a foot of a driver of the vehicle on an accelerator pedal of the vehicle. In some embodiments, the at least one criterion includes whether or not a first computation indicates that the deactivation of the cruise control system will cause a collision with a second vehicle located behind the vehicle. In some embodiments, the first computation includes a velocity of the vehicle, a velocity of the second vehicle, a distance between the vehicle and the second vehicle, and a second computation of an expected deceleration of the vehicle if the cruise control system is deactivated, where the velocity of the second vehicle and the distance to the second vehicle are detected by a second sensor. In some embodiments, the first computation includes an acceleration of the second vehicle, where the acceleration of the second vehicle is detected by the second sensor. In some embodiments, the second sensor includes a radar, lidar, or camera. In some embodiments, the second computation includes a current road slope and a weight of the vehicle. In some embodiments, the current road slope is determined with an inclinometer or positioning sensor. In some embodiments, the second computation includes an aerodynamic drag or rolling resistance of the vehicle. Implementations of the described techniques may include hardware, a method or process, or computer software on a computer-accessible medium.

One general aspect includes a method for overriding a manual deactivation of a cruise control system of a vehicle in a processor including a memory. The method includes receiving a cruise control deactivation signal from a user control while the vehicle is moving; evaluating at least one criterion and, based on the evaluating, either permitting or overriding a deactivation of the cruise control system commanded by the cruise control deactivation signal. Other embodiments of this aspect include corresponding computer systems, apparatus, and computer programs recorded on one or more computer storage devices, each configured to perform the actions of the methods.

Implementations may include one or more of the following features. In some embodiments, the at least one criterion includes whether or not a first sensor detects a foot of a driver of the vehicle on an accelerator pedal of the vehicle. In some embodiments, the at least one criterion includes whether or not a first computation indicates that the deactivation of the cruise control system will cause a collision with a second vehicle located behind the vehicle. In some embodiments, the first computation includes a velocity of the vehicle, a velocity of the second vehicle, a distance between the vehicle and the second vehicle, and a second computation of an expected deceleration of the vehicle if the cruise control system is deactivated, where the velocity of the second vehicle and the distance to the second vehicle are detected by a second sensor. In some embodiments, the first computation includes an acceleration of the second vehicle, where the acceleration of the second vehicle is detected by the second sensor. In some embodiments, the second sensor includes a radar, lidar, or camera. In some embodiments, the second computation includes a current road slope and a weight of the vehicle. In some embodiments, the current road slope is determined with an inclinometer or positioning sensor. In some embodiments, the second computation includes an aerodynamic drag or rolling resistance of the vehicle. Implementations of the described techniques may include hardware, a method or process, or computer software on a computer-accessible medium.

One general aspect includes a system for permitting or overriding a overriding a manual deactivation of a cruise control system. The system also includes a vehicle, a cruise control system of the vehicle, and a user control disposed on the vehicle that, when activated, commands a deactivation of the cruise control system. The system also includes a first sensor disposed on the vehicle and configured to determine whether a driver's foot is on an accelerator pedal of the vehicle, a second sensor disposed on the vehicle and configured to determine a speed of the vehicle, a third sensor disposed on the vehicle and configured to determine a current road slope, and a fourth sensor disposed on the vehicle and configured to determine a distance and speed of a second vehicle approaching the vehicle. The system also includes a processor disposed on the vehicle and configured to, when the user control is activated while the vehicle is in motion: compute an expected distance the vehicle will travel in a time given period, based on the speed of the vehicle, the current road slope, and a mass of the vehicle; compute an expected distance the second vehicle will travel in the given time period, based on the speed of the second vehicle; and, if the expected distance the vehicle will travel minus the expected distance the second vehicle will travel in the time period is less than the distance of the second vehicle, and the driver's foot is not on the accelerator pedal, override the deactivation of the cruise control system, and otherwise permit the deactivation of the cruise control. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the smart cruise control disengagement system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
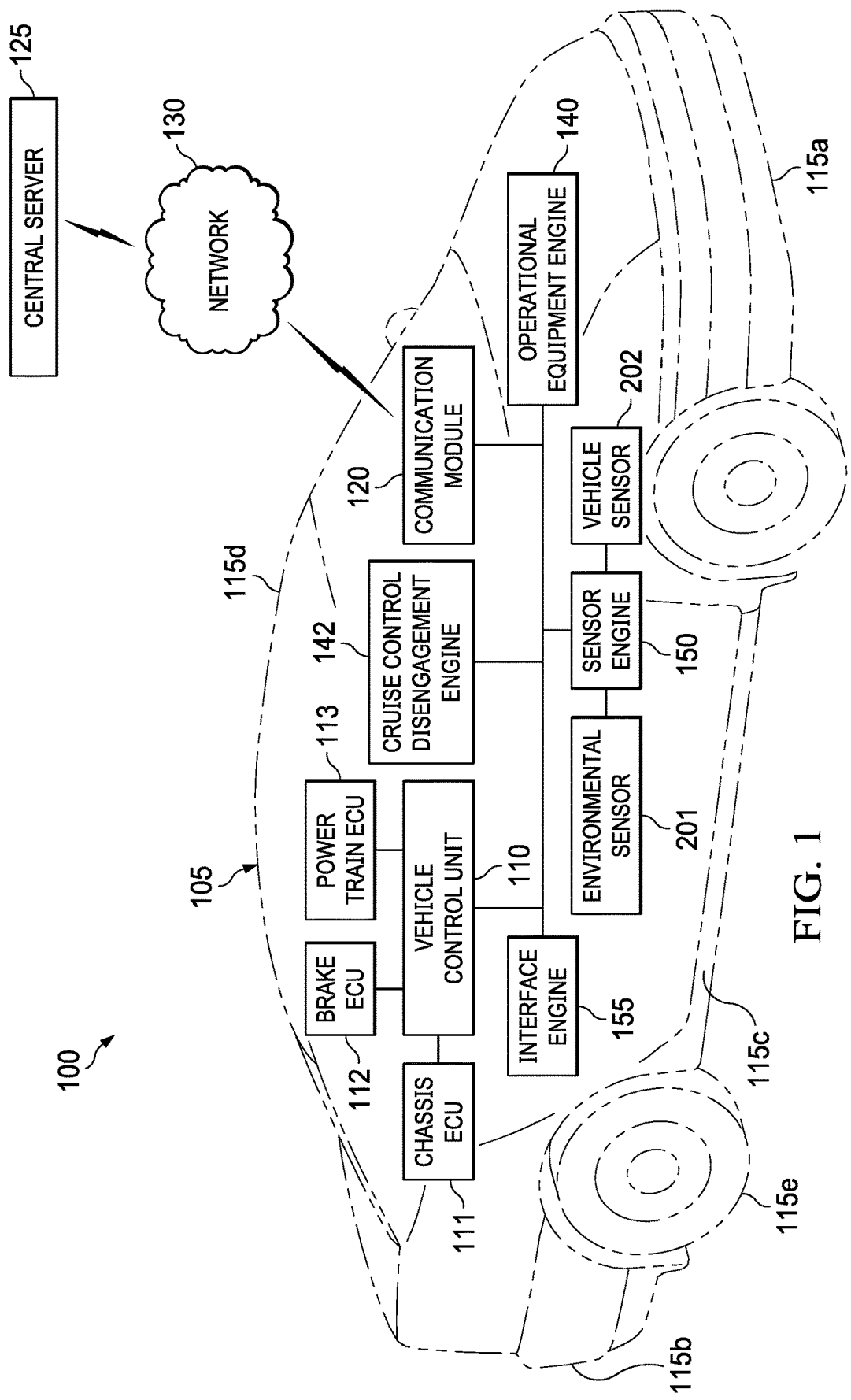
FIG. 1 is an illustration, in a block diagram form, of a smart cruise control disengagement system in accordance with at least one embodiment of the present disclosure.

In accordance with at least one embodiment of the present disclosure, a smart cruise control disengagement system is provided that determines in real time whether disengagement of a cruise control function is unsafe, when such disengagement has been requested by the vehicle driver. In an example "misclick" scenario, the ego vehicle (CAR A) is driving on freeway with its cruise control engaged, and a second vehicle (CAR B) drives up behind CAR A and begins tailgating (e.g., following at a distance less than the safe following distance for the given speed). The driver of CAR A wants to increase speed by adjusting the "+" for cruise control switch, but accidently presses "Cancel", which basically causes vehicle's throttle input to drop to zero. Unfortunately, CAR B is still driving at high speed and could potentially collide with the read end of CAR A. This is only one example of a situation where disengaging the cruise control function is potentially dangerous. Numerous other threats exist, from misclicks to judgment errors to road hazards, which the driver may not be prepared to deal with once the cruise control function is disengaged.

To address this and other problems, the smart cruise control disengagement system of the present disclosure may include predicting the motion of the ego vehicle over a period of time (e.g., the presumed reaction time of the driver) if the throttle input is reduced to zero, tracking and predicting the motion of a second vehicle approaching the ego vehicle from behind over the same period of time, and comparing to see whether the two vehicles are predicted to collide. If a collision is predicted, the system prevents the cruise control function from being disengaged. The smart cruise control disengagement system may take into account such factors as road slope or grade.

The present disclosure aids substantially in the safe control of the vehicle, by ensuring the cruise control function is not disengaged at a time when such disengagement is likely to cause an unsafe condition such as rear-end collision by a vehicle approaching from behind. Implemented on one or more processors within the vehicle, the smart cruise control disengagement system disclosed herein provides practical, real-time calculation of variables affecting the safety of cruise control disengagement. This improved disengagement system transforms a purely manual disengagement procedure into one where the driver requests cruise control disengagement, and the system determines whether this is unsafe, without the normal, routine need for the vehicle driver to check the rearview mirrors to gauge the speed of approaching vehicles and then react with an appropriate throttle setting. This unconventional approach improves the functioning of the vehicle, by reducing the possibility of accidental, erroneous, or inadvisable disengagement of the cruise control feature.

The smart cruise control disengagement system may be implemented as a combination of hardware and/or software modules, and operated by a control process executing on a processor circuit that accepts user inputs from the vehicle operator, and that is in communication with actuators that implement the cruise control function. In that regard, the control process performs certain specific operations in response to different inputs made at different times. Certain structures, functions, and operations of the processor circuit, sensors, and user input systems are recited herein to enable novel features or aspects of the present disclosure with particularity. These descriptions are provided for exemplary purposes only, and should not be considered to limit the scope of the smart cruise control disengagement system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is an illustration, in a block diagram form, of a smart cruise control disengagement system in accordance with at least one embodiment of the present disclosure. In an example, a smart cruise control disengagement system is referred to by the reference numeral 100 and includes a vehicle 105, such as an automobile, and a vehicle control unit (VCU) 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like, including communicating via a combination of one or more or networks). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the smart cruise control disengagement system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously referred to as an engine ECU, power plant ECU, motor ECU, or transmission ECU) that controls elements of the motor and drivetrain. The system also includes one or more environmental sensors 201, one or more vehicle sensors 202, and a cruise control disengagement engine 142, the operation of which will be described below.

It is understood that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
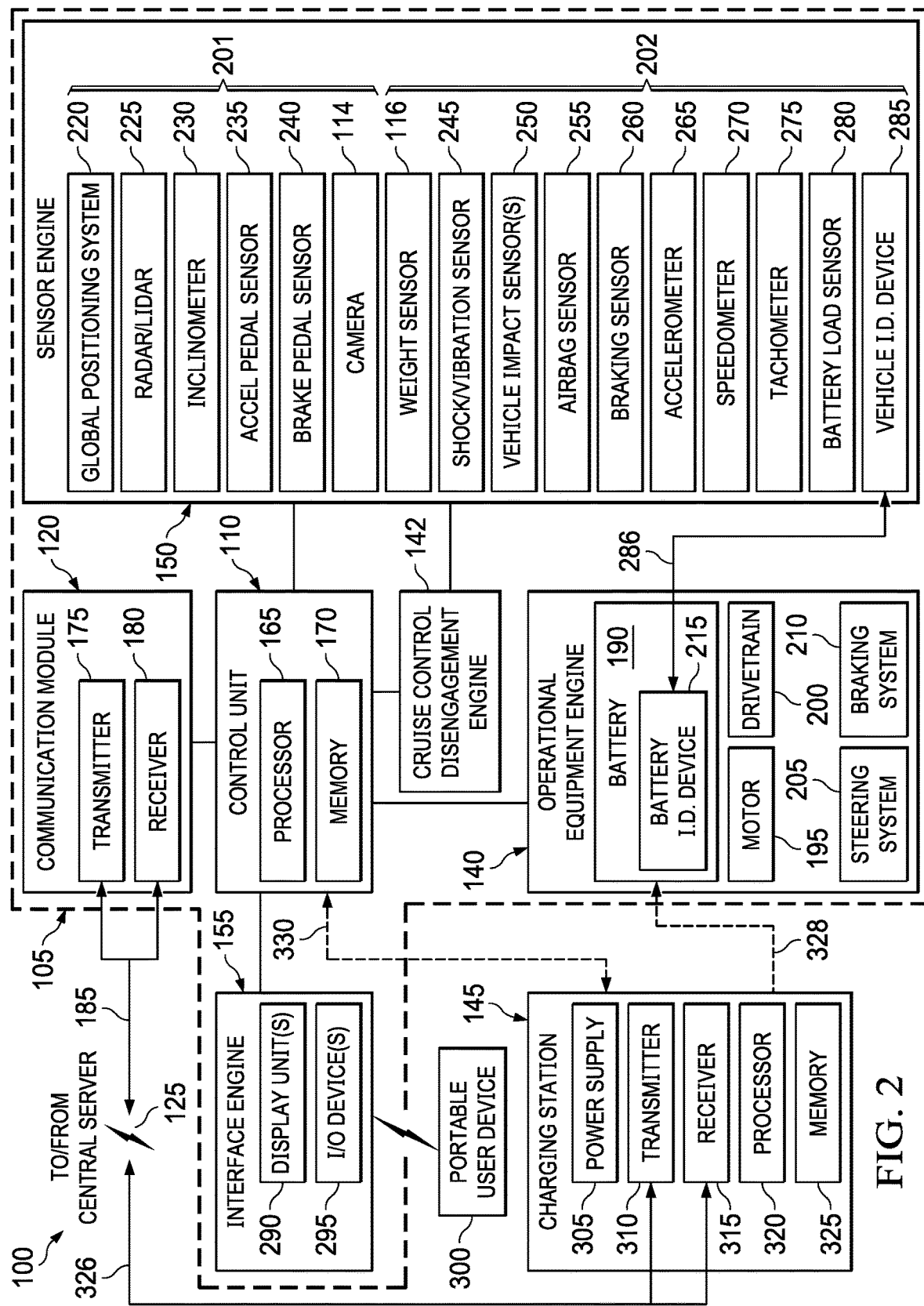
FIG. 2 is an illustration, in a block-diagram form, of at least a portion of the smart cruise control disengagement system of FIG. 1, in accordance with at least one embodiment of the present disclosure.

FIG. 2 is an illustration, in a block-diagram form, of at least a portion of the smart cruise control disengagement system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain or transmission 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system (GPS) or other positioning sensor 220 (e.g., GLONASS, Galileo, LORAN, WiFi triangulation, radio broadcast tower triangulation, or cell tower triangulation system, etc.), RADAR or LIDAR sensor 225, accelerator pedal deflection sensors 235, brake pedal deflection sensors 240, a shock/vibration sensor 245, a vehicle impact sensor 250, an airbag sensor 255, a braking sensor 260, an accelerometer or acceleration sensor 265, a speedometer 270, a tachometer 275, a battery load sensor 280, a vehicle identification device 285, a 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110, brake ECU 112, power train ECU or hybrid ECU 113, and/or cruise control disengagement engine 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110 or brake ECU 112. The accelerometer 265 is adapted to monitor acceleration of the vehicle 105 and to communicate the acceleration information to the vehicle control unit 110, hybrid ECU/power train ECU 113, or cruise control disengagement engine 142. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, hand-held devices, laptops, audio devices, tablet computers, game consoles, cameras, and/or any other suitable devices. In several examples, the portable user device 300 is a smartphone such as, for example, an iPhone® by Apple Incorporated. In other examples, the portable device is, or can serve as, an electronic key fob.

Also visible is a vehicle charging or refueling station 145, which supplies fuel or energy 328 to the operational equipment engine 140, and may include such components as a power supply 305, transmitter 310, receiver 315, processor 320, and memory 325. In some cases, the charging station processor 320 may communicate with the vehicle control unit 110 via communication link 330.

The smart cruise control disengagement system 100 also includes a cruise control disengagement engine 142, the operation of which will be described below. In some embodiments, the cruise control disengagement engine 142 comprises a standalone housing with its own processor and memory. In other embodiments, the cruise control disengagement engine 142 exists as software, firmware, or hardware within another processor, such as the vehicle control unit 110, operational equipment engine 140, brake ECU 112, or power train ECU/hybrid ECU 113. The sensor engine 150 includes environmental sensors 201 and vehicle sensors 202.

It is understood that other components or arrangements of components may be found in a vehicle 105, and that the same general principles apply to electric vehicles, internal combustion vehicles, and hybrid vehicles.

Figure 3:
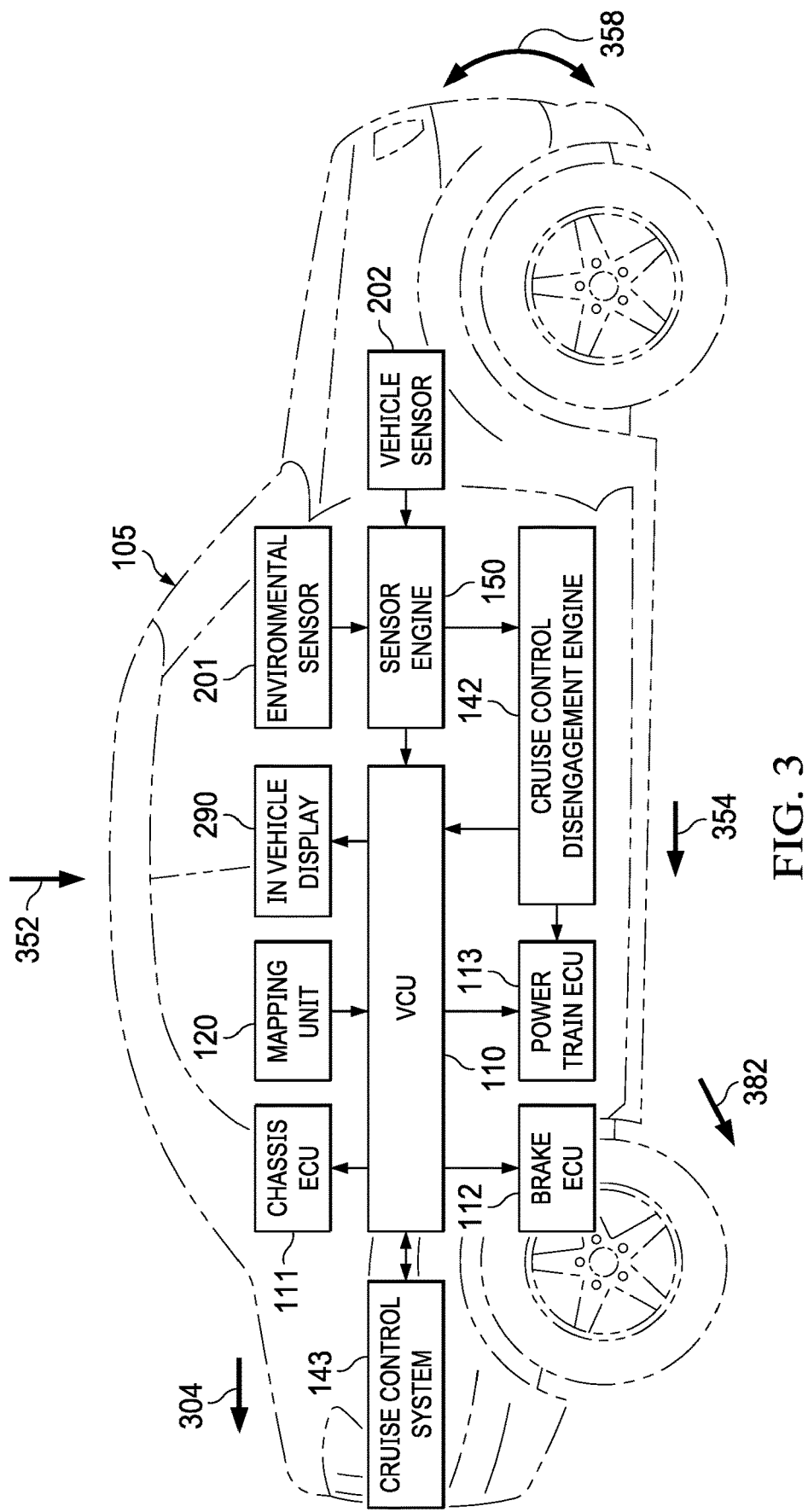
FIG. 3 is an exemplary diagrammatic illustration of at least a portion of the smart cruise control disengagement system, embodied as a vehicle, in accordance with at least one embodiment of the present disclosure.

FIG. 3 is an exemplary diagrammatic illustration of at least a portion of the smart cruise control disengagement system 100 embodied as a vehicle 105 in accordance with at least one embodiment of the present disclosure. In this implementation, for clarity, only certain engines, systems, and components are shown. However, other engines, systems, and components, including those describe herein, are also contemplated as being a part of the smart cruise control disengagement system 100 shown in FIG. 3. In this example, within the vehicle 105 the VCU 110 receives information from a sensor engine 150, which receives information from environmental sensors 201 and vehicle sensors 202. In addition, the VCU 110 sends information to the chassis ECU 111, brake ECU 112, power train ECU 113, and in-vehicle display 290.

Force variables that may be incorporated into physics calculations within the VCU 110 (or other processor within the vehicle) include but are not limited to the vehicle absolute weight 352, vehicle rolling friction 354, vehicle aerodynamic drag 304, and vehicle pitch 358. In some examples, each of these variables is a force that may be expressed in lbf, Newtons, or any other unit of force as desired. In an example, the vehicle pitch 358 is stored within the memory 170 of the Vehicle Control Unit 110, and is calculated based on data from the accelerometer 265 to provide a sensed acceleration, and the first derivative of the vehicle speed from the speedometer 270 to provide an acceleration value tangent to the road surface. The difference between these two acceleration vectors indicates vehicle pitch 358. Vehicle pitch may also be measured with an inclinometer or geomagnetometer.

Other variables may not be directly known, but may be estimated from graphs, curves, or lookup tables for a nominal vehicle (e.g., vehicle weight 352, vehicle rolling friction 354, and vehicle aerodynamic drag 304). Some variables may be calculated or estimated from performance variables that normally exist within the VCU 110. For example, the combined mass, gross weight, or inertia of the vehicle 105 may be determined from the acceleration profile of the vehicle given a known force imparted by the motor 195 and drivetrain 200, and the Newtonian relationship $F=ma$. The mass of the carried load may then be estimated by subtracting a nominal or expected vehicle mass (e.g., stock weight or stock mass). Alternatively, if the road grade is known (e.g., from GPS data), the combined vehicle and carried load mass may be estimated based on the work or energy required for the operational equipment engine to push the vehicle uphill, or the force required hold it from rolling backward.

The total drag on the vehicle can be calculated based on the power output required to maintain a particular vehicle speed, and the sum of nominal or estimated values of the vehicle rolling friction 354 and aerodynamic drag 304. The ratio of aerodynamic drag to rolling friction can be estimated from known relationships for typical vehicles, or by other methods. The grade of the road or ground surface under the vehicle may be calculated from accelerometers, or may be calculated or taken directly from stored maps, GPS data or other indicators. The combination of vehicle weight 352, vehicle aerodynamic drag 304, and vehicle rolling friction 354 can be used to compute a vehicle rolling resistance vector 382 (e.g., as a vector sum of the force vectors). Histories, time averages, first derivatives, integrals, or filters of any of the aforementioned variables, along with known, anticipated, or estimated future values for some or all of the variables may also be incorporated into the physics calculations to improve or refine the results of the calculations. Accelerator pedal position may also be incorporated as being proportional to an expected power output from the motor 195.

The smart cruise control disengagement system 100 also includes a cruise control system 143, which controls the speed of the vehicle when engaged, and a cruise control disengagement engine 142, which accepts inputs from the sensor engine (e.g., inputs from the inclinometer 230, RADAR/LIDAR 225, camera 114, accelerator pedal sensor 235, or weight sensor 116 of FIG. 2) and provides outputs, for example, to the VCU 110 or power train ECU 113.

Figure 4:
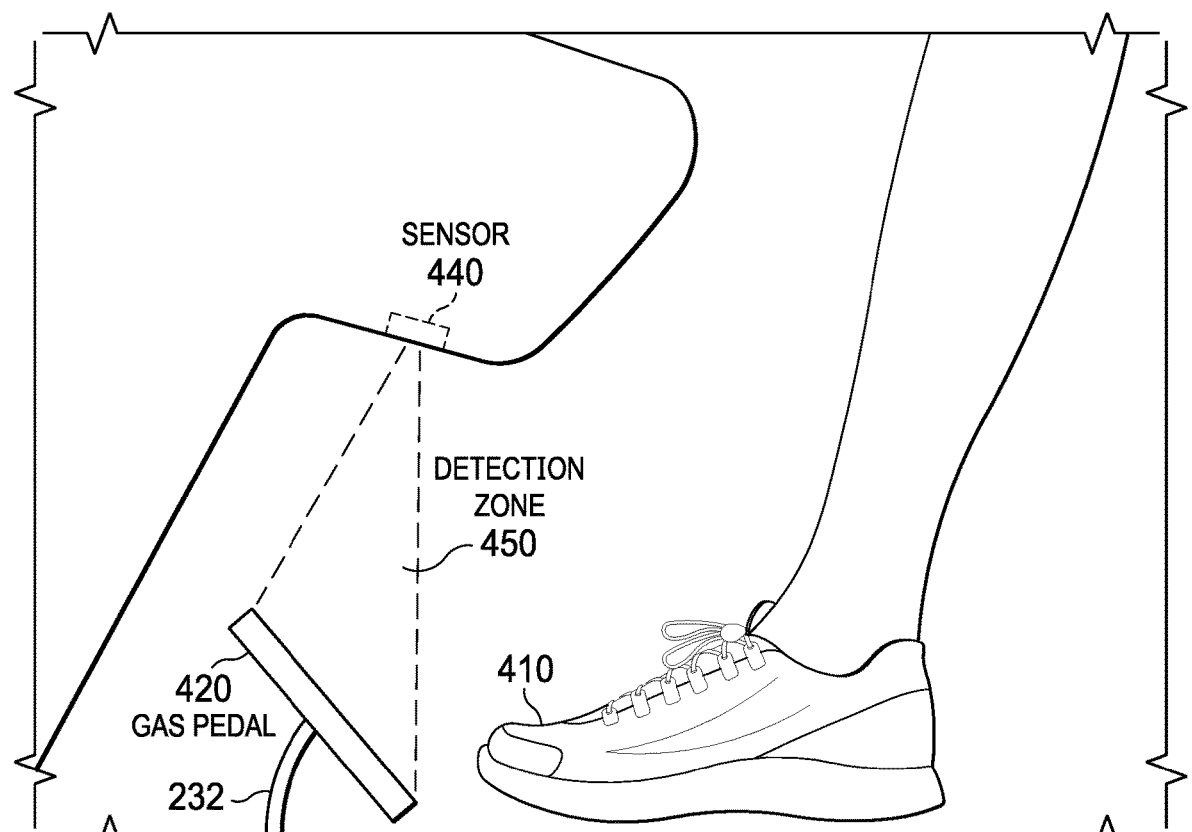
FIG. 4 is a side schematic view of an accelerator pedal and associated sensors, in accordance with at least one embodiment of the present disclosure.

FIG. 4 is a side schematic view of an accelerator pedal 420 and associated sensors 440 and 232, in accordance with at least one embodiment of the present disclosure. The driver's foot 410 can be detected on the accelerator pedal 420 by, for example, measuring the pedal deflection or force applied to the accelerator pedal 420 using an accelerator pedal sensor 232 (e.g., a linear encoder, rotary encoder, or load cell). Depending on the implementation, the driver's foot 410 may be presumed to be present on the accelerator pedal 420 if there is any force on, or deflection of, the accelerator pedal 420 beyond what is commanded by the cruise control system, or by another system (e.g., an ADAS system) of the vehicle. This may imply, for example, that the driver is ready to maintain or increase the throttle setting (by depressing the accelerator pedal) if the cruise control function is disengaged.

In other embodiments, the vehicle includes a foot sensor 440 (e.g., a camera, light sensor, RADAR, LIDAR, or ultrasonic sensor) that is capable of detecting an object within a detection zone 450. In some embodiments, any object within the detection zone 450 may be presumed to be the driver's foot 410, and therefore it may be presumed that the driver's foot 410 is on or near the accelerator pedal 420 when such a detection has occurred. In other embodiments, the foot sensor 440 is configured to detect the driver's foot 410 more specifically, e.g., by matching its size, shape, or density to an expected range for a driver's foot.

Still other devices and methods may be employed to detect whether the driver's foot is located on or near the accelerator pedal, including but not limited to image recognition, shape recognition, deep learning, or kinematic tracking of the driver's limbs.

Figure 5:
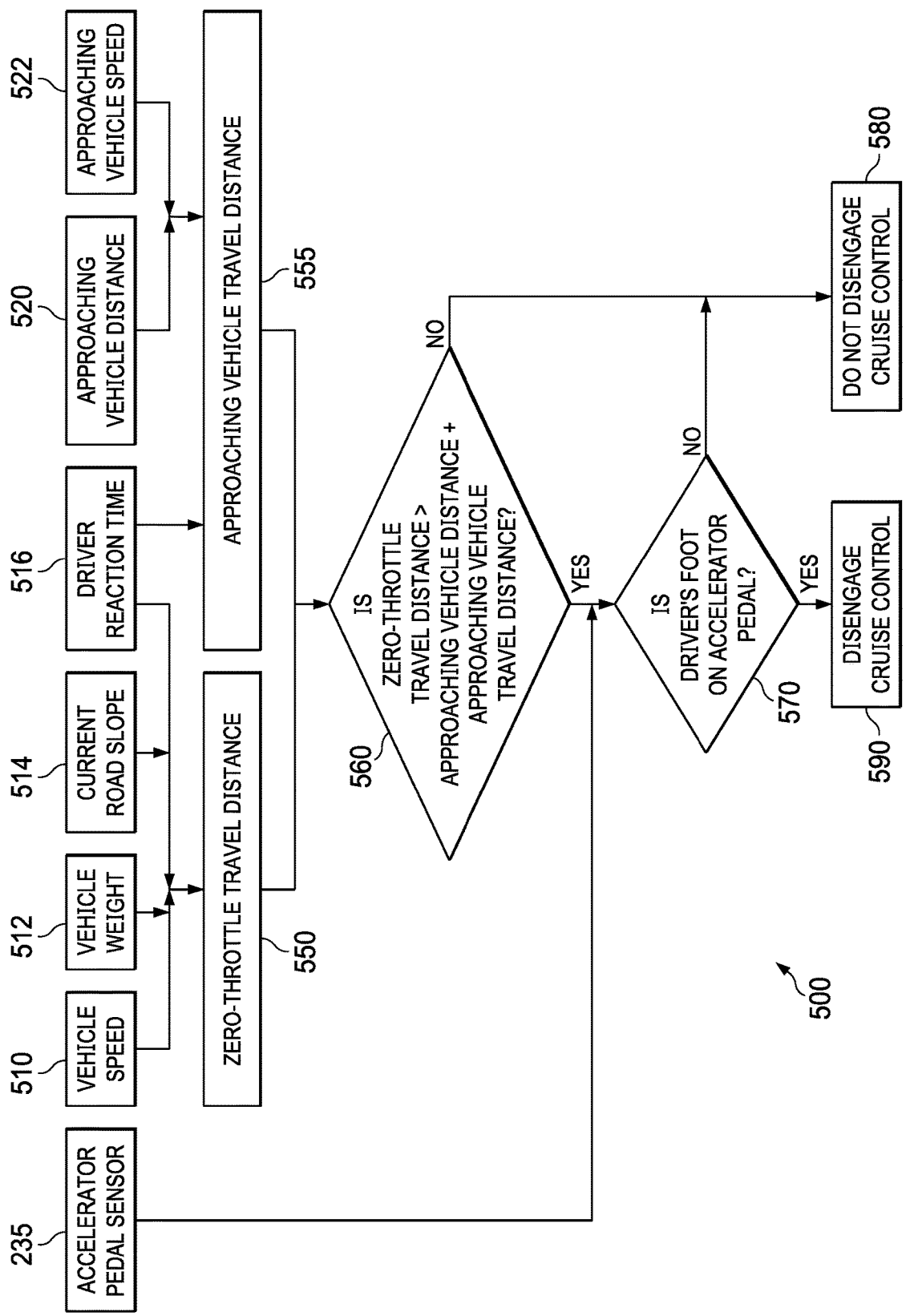
FIG. 5 is a flow diagram of an example smart cruise control disengagement method, in accordance with at least one embodiment of the present disclosure.

FIG. 5 is a flow diagram of an example smart cruise control disengagement method 500, in accordance with at least one embodiment of the present disclosure. It is understood that the steps of method 500 may be performed in a different order than shown in FIG. 5, additional steps can be provided before, during, and after the steps, and/or some of the steps described can be replaced or eliminated in other embodiments. One or more of steps of the method 500 can be carried by one or more devices and/or systems described herein, such as components of the VCU 110, power train ECU 113, cruise control disengagement engine 142 of FIG. 2, or the processor circuit 650 of FIG. 6.

The method 500 may for example be executed if the smart cruise control disengagement system detects a switch click or other input that seems to indicate a driver's intention to disengage the cruise control function.

In step 550, the method 500 includes analyzing the vehicle speed 510 (e.g., as determined by the speedometer 270 of FIG. 2), the vehicle weight 512 (e.g., a stock weight, or a stock weight plus a load weight as detected by the weight sensor 116 of FIG. 2), the current road slope 514 (e.g., as determined by the GPS or navigation sensor 220 or inclinometer 230 of FIG. 2), and a time period 516 (e.g., a presumed driver reaction time of 1.5 seconds, although other values both larger and smaller may be used instead or in addition). As described above in FIG. 3, these variables may be incorporated into physics calculations that may then be used to determine an expected distance that the ego vehicle will travel if its throttle input is reduced to zero (e.g., of the cruise control is canceled).

The physics calculations may for example include computing an expected deceleration of the ego vehicle if the cruise control function is disengaged. The computation of expected deceleration may take into account not only the vehicle weight 512 and current road slope 514, but also an aerodynamic drag or rolling resistance of the vehicle based on the vehicle speed 510. In some embodiments, the aerodynamic drag or rolling resistance may be a performance variable calculated (e.g., by the VCU) in real time or near-real time, based on performance of the vehicle. In other embodiments, the expected aerodynamic drag or rolling resistance may be based on an expected value for a stock vehicle and retrieved, for example, from a lookup table. The expected distance that the ego vehicle will travel can then be computed from the speed 510 (v), the deceleration (a), and the time period 516 (t), using the Newtonian relationship $d = vt - (½)at^2$.

In step 555, the method includes analyzing the time period 516, as well as the detected distance 520 and speed 522 of a second vehicle approaching from the rear (e.g., as detected by the RADAR or LIDAR sensor 225 of FIG. 2, or by other means such as a camera 114, ultrasonic sensor, or other sensor or combination of sensors). As described above in FIG. 3, these variables may be used to determine an expected distance that the second vehicle will travel if its current speed or acceleration remains constant over the time period. In some embodiments, a sensed acceleration or deceleration of the approaching vehicle may also be included in the calculation of the expected travel distance.

In step 560, the method includes determining whether the zero-throttle travel distance determined at step 550 is greater than the sum of the second vehicle's distance, the second vehicle's expected travel distance, and a specified safety tolerance. If yes, execution proceeds to step 570. If no, execution proceeds to step 580.

In step 570, the method includes detecting whether the driver's foot is located on or near the accelerator pedal (e.g., as detected by the accelerator pedal sensor 235, or by the foot sensor 440 of FIG. 4). If no, execution proceeds to step 580. If yes, execution proceeds to step 590.

In step 580, the method includes determining that it is not safe to disengage the cruise control function, and therefore not commanding it to disengage. The method is then complete.

In step 590, the method includes determining that it is safe to disengage the cruise control function, and therefore commanding it to disengage. The method is then complete.

In the example shown in FIG. 5, disengagement of the cruise control function is prevented if a collision is predicted OR the driver's foot is not on the accelerator. In other embodiments, disengagement of the cruise control is prevented if a collision is predicted AND the driver's foot is not on the accelerator. In some embodiments, a statistical probability of collision may be determined, and disengagement of the cruise control function may be permitted only if the probability of collision falls below a specified threshold value.

In some embodiments, the system could be configured prevent disengagement of the cruise control function even if no second vehicle is approaching from behind. For example, the smart cruise control disengagement system could ignore a driver's request to disengage cruise control at any time if the driver's foot is not on the accelerator pedal, or at times when the vehicle is on a slope steeper than a given threshold amount (e.g., as detected by an inclinometer or GPS), or on a curve tighter than a given threshold amount (e.g., as detected by steering wheel deflection, or based on other road conditions or driver body poses. In other embodiments, the system may analyze the force and/or direction of a button press or switch click for disengaging the cruise control, to determine whether the button press or switch click may be accidental. Still other methods are contemplated to accomplish the goal of preventing cruise control from being manually disengaged if such disengagement is deemed to be accidental, unsafe, or inadvisable.

Figure 6:
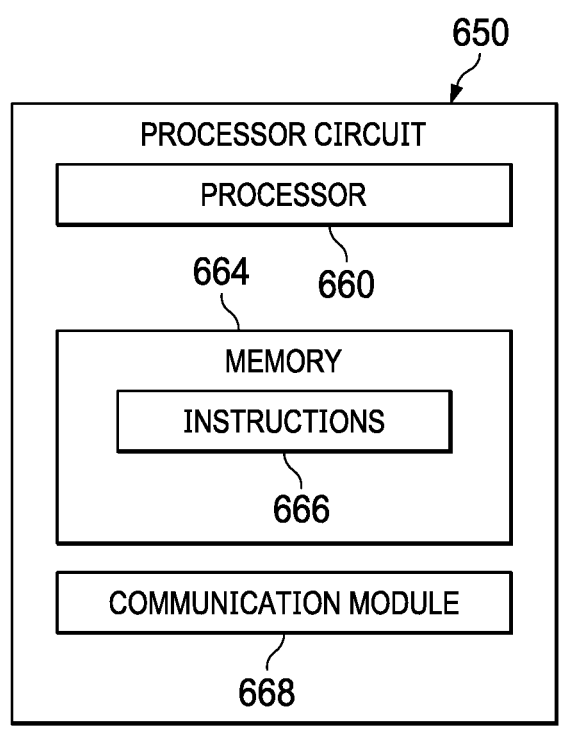
FIG. 6 is an illustration, in a block-diagram form, of a processor circuit, according to embodiments of the present disclosure.

FIG. 6 is a schematic diagram of a processor circuit 650, according to embodiments of the present disclosure. The processor circuit 650 may be implemented in the cruise control disengagement engine 142, VCU 110, or power train ECU 113 of FIGS. 1 and 2, the portable device 300 of FIG. 2, or other devices or workstations (e.g., third-party workstations, network routers, etc.), or on a cloud processor or other remote processing unit, as necessary to implement the method. As shown, the processor circuit 650 may include a processor 660, a memory 664, and a communication module 668. These elements may be in direct or indirect communication with each other, for example via one or more buses.

The processor 660 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 660 may also comprise another hardware device, a firmware device, or any combination thereof configured to perform the operations described herein. The processor 660 may also be implemented as a combination of computing devices, e.g., a combination of a DSP and a microprocessor, a plurality of microprocessors, one or more microprocessors in conjunction with a DSP core, or any other such configuration. In some instances, the processor 660 may comprise multiple processors or sub-processors in different locations, as when calculations are performed across a network.

The memory 664 may include a cache memory (e.g., a cache memory of the processor 660), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 664 includes a non-transitory computer-readable medium. The memory 664 may store instructions 666. The instructions 666 may include instructions that, when executed by the processor 660, cause the processor 660 to perform the operations described herein. Instructions 666 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 668 can include any electronic circuitry and/or logic circuitry to facilitate direct or indirect communication of data between the processor circuit 650, and other processors or devices. In that regard, the communication module 668 can be an input/output (I/O) device. In some instances, the communication module 668 facilitates direct or indirect communication between various elements of the processor circuit 650 and/or the smart cruise control disengagement system 100. The communication module 668 may communicate within the processor circuit 650 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, data transmission between the processor and central server, or readings from the smart cruise control disengagement system) may be accomplished using any suitable wireless or wired communication technology, e.g., a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the smart cruise control disengagement system advantageously provides a capability for real-time prevention of cruise control disengagement based on road conditions and possible safety hazards. Depending on the implementation, a number of variations are possible on the examples and embodiments described above. For example, the technology may be applied to different vehicle types, including on-road and off-road vehicles, two-wheeled, three-wheeled, four-wheeled, and multi-wheeled vehicles, internal combustion vehicles, electric vehicles, hybrid vehicles, manually operated vehicles, partially autonomous vehicles, and fully autonomous vehicles. Other variables and other logical or arithmetic operations may be employed than those described above, in order to achieve the desired effect of preventing unsafe disengagement of the cruise control function.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the smart cruise control disengagement system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the smart cruise control disengagement system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle comprising a cruise control deactivation system, the system comprising:
   a cruise control system;
   a user control that, when activated, commands deactivation of the cruise control system; and
   a processor configured to permit or override the commanded deactivation of the cruise control system while the vehicle is moving, based on at least one criterion,
   wherein the at least one criterion comprises whether or not a first computation indicates that the deactivation of the cruise control system will cause a collision with a second vehicle located behind the vehicle.

2. The vehicle of claim 1, wherein the at least one criterion further comprises whether or not a first sensor detects a foot of a driver of the vehicle on an accelerator pedal of the vehicle.

3. The vehicle of claim 1, wherein the first computation comprises a velocity of the vehicle, a velocity of the second vehicle, a distance between the vehicle and the second vehicle, and a second computation of an expected deceleration of the vehicle if the cruise control system is deactivated, wherein the velocity of the second vehicle and the distance to the second vehicle are detected by a second sensor.

4. The vehicle of claim 3, wherein the first computation comprises an acceleration of the second vehicle, wherein the acceleration of the second vehicle is detected by the second sensor.

5. The vehicle of claim 3, wherein the second sensor comprises a radar, lidar, or camera.

6. The vehicle of claim 3, wherein the second computation comprises a current road slope and a weight of the vehicle.

7. The vehicle of claim 6, wherein the current road slope is determined with an inclinometer or positioning sensor.

8. The vehicle of claim 3, wherein the second computation comprises an aerodynamic drag or rolling resistance of the vehicle.

9. A method for overriding a manual deactivation of a cruise control system of a vehicle, the method comprising:
   in a processor comprising a memory:
      receiving a cruise control deactivation signal from a user control while the vehicle is moving;
      evaluating at least one criterion; and
      based on the evaluating, either permitting or overriding a deactivation of the cruise control system commanded by the cruise control deactivation signal,
      wherein the at least one criterion comprises whether or not a first computation indicates that the deactivation of the cruise control system will cause a collision with a second vehicle located behind the vehicle.

10. The method of claim 9, wherein the at least one criterion further comprises whether or not a first sensor detects a foot of a driver of the vehicle on an accelerator pedal of the vehicle.

11. The method of claim 9, wherein the first computation comprises a velocity of the vehicle, a velocity of the second vehicle, a distance between the vehicle and the second vehicle, and a second computation of an expected deceleration of the vehicle if the cruise control system is deactivated, wherein the velocity of the second vehicle and the distance to the second vehicle are detected by a second sensor.

12. The method of claim 11, wherein the first computation comprises an acceleration of the second vehicle, wherein the acceleration of the second vehicle is detected by the second sensor.

13. The method of claim 11, wherein the second sensor comprises a radar, lidar, or camera.

14. The method of claim 11, wherein the second computation comprises a current road slope and a weight of the vehicle.

15. The method of claim 14, wherein the current road slope is determined with an inclinometer or positioning sensor.

16. The method of claim 11, wherein the second computation comprises an aerodynamic drag or rolling resistance of the vehicle.

17. A system for permitting or overriding a overriding a manual deactivation of a cruise control system, the system comprising:
   a vehicle;
   a cruise control system of the vehicle;
   a user control disposed on the vehicle that, when activated, commands a deactivation of the cruise control system;
   a first sensor disposed on the vehicle and configured to determine whether a driver's foot is on an accelerator pedal of the vehicle;
   a second sensor disposed on the vehicle and configured to determine a speed of the vehicle;
   a third sensor disposed on the vehicle and configured to determine a current road slope;
   a fourth sensor disposed on the vehicle and configured to determine a distance and speed of a second vehicle approaching the vehicle;
   a processor disposed on the vehicle and configured to, when the user control is activated while the vehicle is in motion:
      compute an expected distance the vehicle will travel in a time given period, based on the speed of the vehicle, the current road slope, and a mass of the vehicle;
      compute an expected distance the second vehicle will travel in the given time period, based on the speed of the second vehicle; and
      if the expected distance the vehicle will travel minus the expected distance the second vehicle will travel in the time period is less than the distance of the second vehicle, and the driver's foot is not on the accelerator pedal, override the deactivation of the cruise control system, and otherwise permit the deactivation of the cruise control.

* * * * *